United States Patent
Khanna et al.

(10) Patent No.: US 7,437,643 B2
(45) Date of Patent: Oct. 14, 2008

(54) AUTOMATED BIST EXECUTION SCHEME FOR A LINK

(75) Inventors: Rahul Khanna, Beaverton, OR (US); Mohan J. Kumar, Aloha, OR (US); Jay Nejedlo, Wilsonville, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/157,526

(22) Filed: Jun. 21, 2005

(65) Prior Publication Data

US 2007/0011536 A1    Jan. 11, 2007

(51) Int. Cl.
  *G01R 31/28*    (2006.01)
(52) U.S. Cl. .................. 714/733; 714/715; 714/738; 714/730; 714/724; 714/706; 714/704; 714/707; 714/708; 714/712; 709/230; 365/201; 365/189.05
(58) Field of Classification Search .................. None
  See application file for complete search history.

(56) References Cited

U.S. PATENT DOCUMENTS

| | | | | |
|---|---|---|---|---|
| 5,974,502 | A * | 10/1999 | DeKoning et al. | 711/114 |
| 6,505,317 | B1 * | 1/2003 | Smith et al. | 714/738 |
| 6,684,292 | B2 * | 1/2004 | Piccirillo et al. | 711/106 |
| 6,826,100 | B2 * | 11/2004 | Ellis et al. | 365/201 |
| 6,907,377 | B2 * | 6/2005 | Slaight et al. | 702/117 |
| 7,132,823 | B2 * | 11/2006 | Ng et al. | 324/158.1 |
| 7,139,957 | B2 * | 11/2006 | Querbach et al. | 714/745 |
| 2003/0046618 | A1 * | 3/2003 | Collins | 714/700 |
| 2004/0117707 | A1 * | 6/2004 | Ellis et al. | 714/733 |
| 2004/0117708 | A1 | 6/2004 | Ellis et al. | |
| 2004/0117709 | A1 | 6/2004 | Nejedlo et al. | |
| 2004/0186688 | A1 | 9/2004 | Nejedlo | |
| 2004/0193976 | A1 | 9/2004 | Slaight et al. | |
| 2004/0193986 | A1 | 9/2004 | Canagasaby et al. | |
| 2004/0204879 | A1 | 10/2004 | Slaight et al. | |
| 2004/0204912 | A1 | 10/2004 | Nejedlo et al. | |
| 2005/0021797 | A1 * | 1/2005 | Talaat et al. | 709/230 |
| 2005/0080581 | A1 | 4/2005 | Zimmerman et al. | |
| 2006/0149982 | A1 * | 7/2006 | Vogt | 713/320 |
| 2006/0150030 | A1 * | 7/2006 | Mirabeau et al. | 714/42 |
| 2006/0200713 | A1 * | 9/2006 | Slobodnik et al. | 714/718 |
| 2007/0022335 | A1 * | 1/2007 | Shin et al. | 714/718 |

OTHER PUBLICATIONS

Nejedlo, Jay J., "IBIST™ (Interconnect Built-in Self-Test) Architecture and Methodology for PCT Express: Intel's Next-Generation Test and Validation Methodology for Performance IO," ITC International Test Conference, 2003 IEEE, pp. 114-122.

* cited by examiner

*Primary Examiner*—Jacques Louis-Jacques
*Assistant Examiner*—Guerrier Merant
(74) *Attorney, Agent, or Firm*—Blakely, Sokoloff, Taylor & Zafman LLP (57) ABSTRACT

Training of a link is performed, wherein the link is an interconnect between two devices of a computer system. A built-in self-test (BIST) of the link is performed. A result from the link training is compared to a result from the BIST. A link status of the link is posted, wherein the link status is based at least in part on the result from the link training and the result from the BIST.

10 Claims, 8 Drawing Sheets

AUTOMATED BIST EXECUTION SCHEME FOR A LINK

BACKGROUND

1. Field

Embodiments of the invention relate to the field of computer systems and more specifically, but not exclusively, to an automated Built-in-Self-Test (BIST) execution scheme for a link.

2. Background Information

Devices of a computer system often communicate with each other using a link, such as a Peripheral Component Interconnect (PCI) Express link. A link may also be referred to as an interconnect. At system startup, a link is initialized to establish communications between devices on each end of the link. The physical layer of a link may also be connected to a Built-in Self-Test (BIST) on one or both ends of the link. However, in today's systems, the is no coordination between the link initialization and the Built-in Self-Test.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention may be implemented in compliance with the *PCI Express Base Specification Revision* 1.0a, Apr. 15, 2003 (hereafter referred to as the "PCIe specification"). However, it will be understood that embodiments of the present invention are not limited to PCIe, but may be implemented using other link architectures.

In one embodiment of a point-to-point topology, a source is interconnected with a destination using a link. Devices in such a point-to-point link have a dedicated connection to each other. Multiple devices do not cooperatively share a transmission path, as in a bus configuration.

Figure 1:
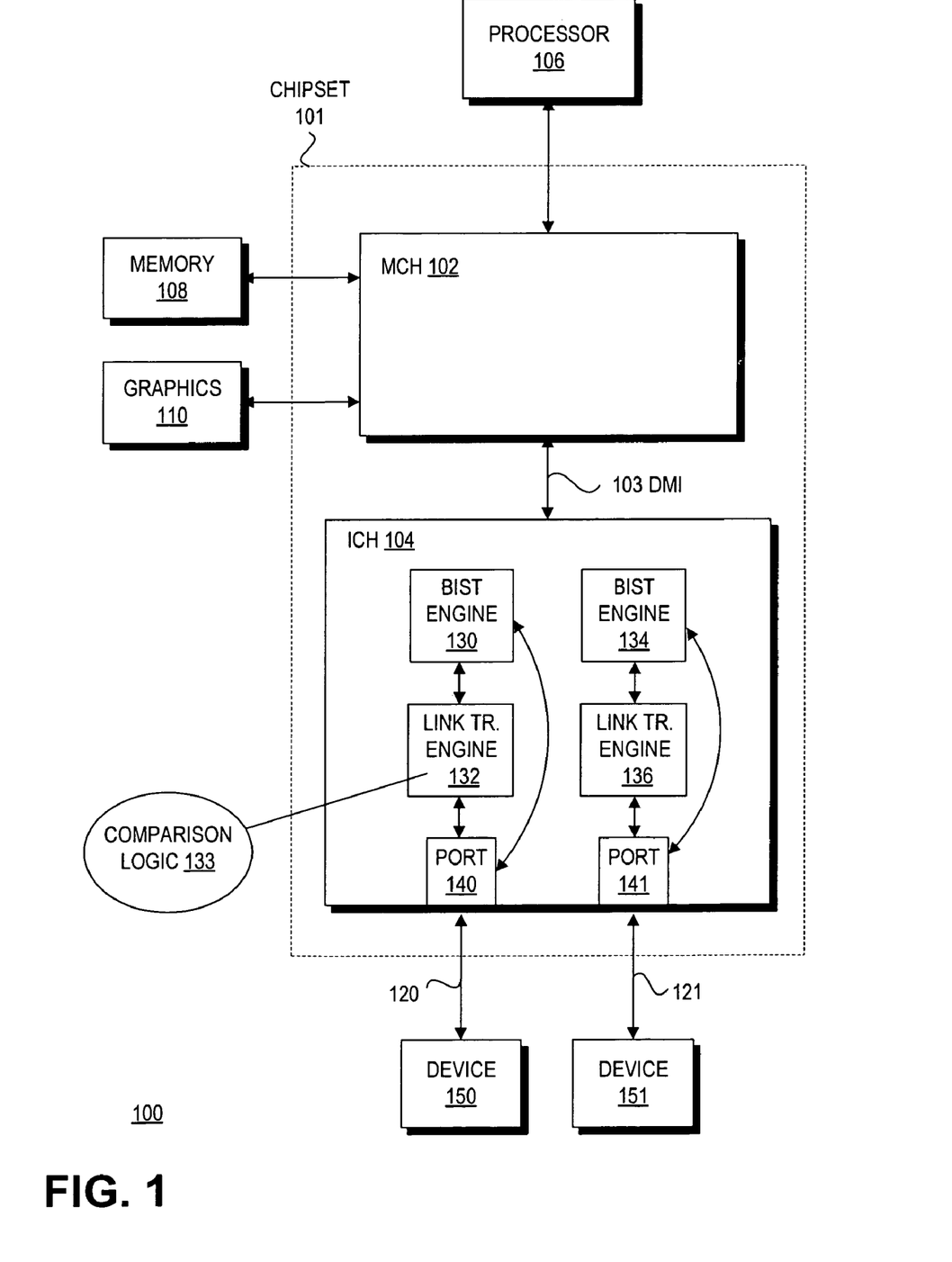
FIG. 1 is a block diagram illustrating an environment to support automated BIST execution for a link in accordance with one embodiment of the present invention.

Turning to FIG. 1, a computer system 100 in accordance with one embodiment of the invention is shown. Embodiments of computer system 100 include, but are not limited to, a desktop computer, a notebook computer, a server, a personal digital assistant, a network workstation, or the like. Computer system 100 includes an Input/Output (I/O) controller, such as Input/Output Controller Hub (ICH) 104, coupled to a memory controller, such as Memory Controller Hub (MCH) 102. In one embodiment, ICH 104 is coupled to MCH 102 via a Direct Media Interface (DMI) 103.

A processor 106 and memory 108 are coupled to MCH 102. In one embodiment, processor 106 includes a Central Processing Unit (CPU). Embodiments of processor 106 and memory 108 are discussed below in conjunction with FIG. 8.

MCH 102 may also be coupled to a graphics processor 110. Graphics processor 110 may be coupled to MCH 102 via a PCIe link, an Accelerated Graphics Port (AGP) interface, or the like. In other embodiments, one or more additional devices, such as a network interface, may be coupled to MCH 102 by a PCIe link.

In one embodiment, MCH 102 and ICH 104 are part of a chipset 101 of computer system 100. MCH 102 and ICH 104 may be mounted to a board, where the board includes sockets to receive processor 106 and memory 108. In one embodiment, ICH 104 includes an Intel® ICH family of I/O controllers. ICH 104 may include support for a Serial Advanced Technology Attachment (SATA) interface, an Integrated Drive Electronics (IDE) interface, a Universal Serial Bus (USB), and a Low Pin Count (LPC) bus. Flash memory may be coupled to ICH 104 via a LPC bus. Such flash memory may have stored instructions that include the firmware layer of computer system 100. Such instructions may also be referred to as the Basic Input/Output System (BIOS) of computer system 100.

ICH 104 may also include PCIe ports 140 and 141. While the embodiment shown in FIG. 1 shows an I/O controller having two PCIe ports, it will be understood that embodiments of ICH 104 are not limited to two PCIe ports.

Port 140 is coupled to a device 150 by PCIe link 120. Port 141 is coupled to a device 151 via PCIe link 121. In an alternative embodiment, a port may by coupled to a switch (not shown) to provide additional PCIe ports for connecting additional devices. PCIe links 120 and 121 may be implemented using electrical signals, optical signals, or any combination thereof. For example, link 120 may include an optical fiber where each end of the link is coupled to a transceiver for converting between electrical signals and optical signals.

Devices 150 and 151 may be coupled to ICH 104 using expansion card connections or cable connections. Embodiments of devices 150 and 151 may include internal devices and/or external devices. Such devices may include magnetic disk drives, optical disk drives, networking cards, modems, or the like.

Port 140 may be coupled to a link training engine 132 and a BIST engine 130. Link training engine 132 and BIST engine 130 may also be coupled together. In a similar manner, port 141 may be coupled to link training engine 136 and BIST engine 134, and link training engine 136 may be coupled to BIST engine 134.

Link training engines 132 and 136 provide initialization of their respective links during system startup as well as during hot-plugging of devices. Hot-plugging includes adding a device to computer system 100 after computer system 100 has been started. In one embodiment, link training engines 132 and 136 are hardware engines that are part of ICH 104 and operate without software support. In one embodiment, such hardware engines may be implemented as Application Specific Integrated Circuits (ASICs). Link training engines 132 and 136 operate on the physical layer of link 120 and 121, respectively.

BIST engines 130 and 134 may perform circuit testing of the physical layer of links 120 and 121, respectively. In one embodiment, BIST engines 130 and 134 may test such electrical characteristics such as signal integrity, crosstalk, internal hardware states, or the like. BIST engines 130 and 134 are hardware engines of ICH 104 that operate without software support.

In one embodiment, link training engines 132 and 136 are each substantially in compliance with the Link Training and Status State Machine as described in the PCIe specification (discussed further below). In one embodiment, each BIST engine 130 and 134 include Interconnect-BIST (IBIST™) architecture as promulgated by the Intel® Corporation, Santa Clara, Calif. (discussed further below).

Embodiments of the invention provide for coordinated activity between a BIST engine and a link training engine. The results of link training and BIST testing may be compared and integrated for reporting a coordinated link status. In one embodiment, link training engine 132 includes comparison logic 133 for comparing the results of link training and BIST testing. In other embodiments, BIST testing may be conducted automatically in conjunction with link training.

Further, embodiments herein provide for coordinated link training and BIST testing without support from software. Complicity from an Operating System (OS) or other related software is not need for testing and detecting link problems. Thus, embodiments herein allow for coordinated link training and BIST testing across various platforms without the need for system specific software for each type of operating system (e.g., Windows XP, Windows "Longhorn", Linux, etc.).

Figure 2A:
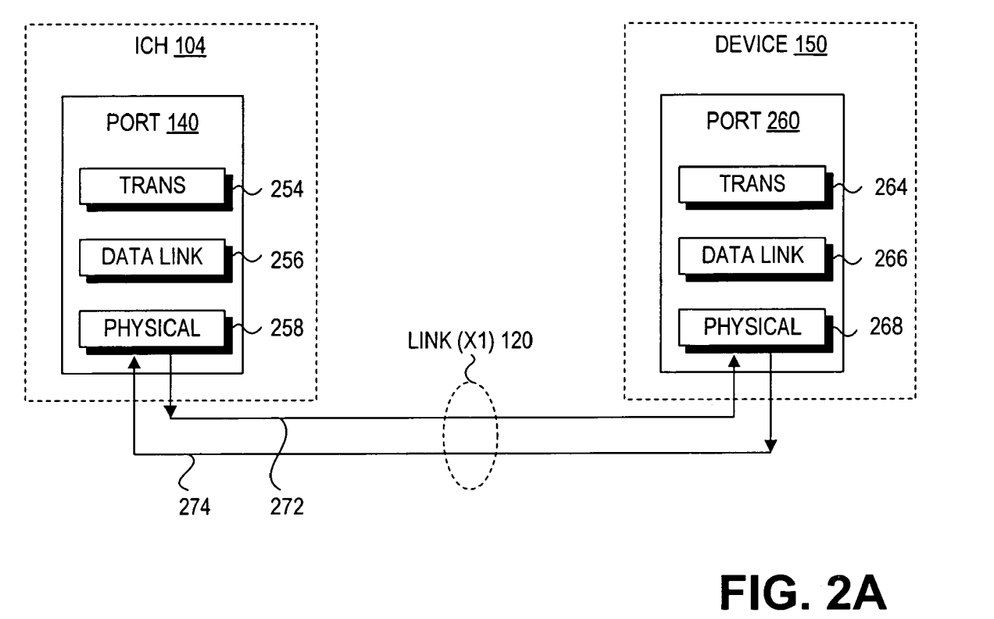
FIG. 2A is a block diagram illustrating a PCI Express (PCIe) link in accordance with one embodiment of the present invention.
Figure 2B:
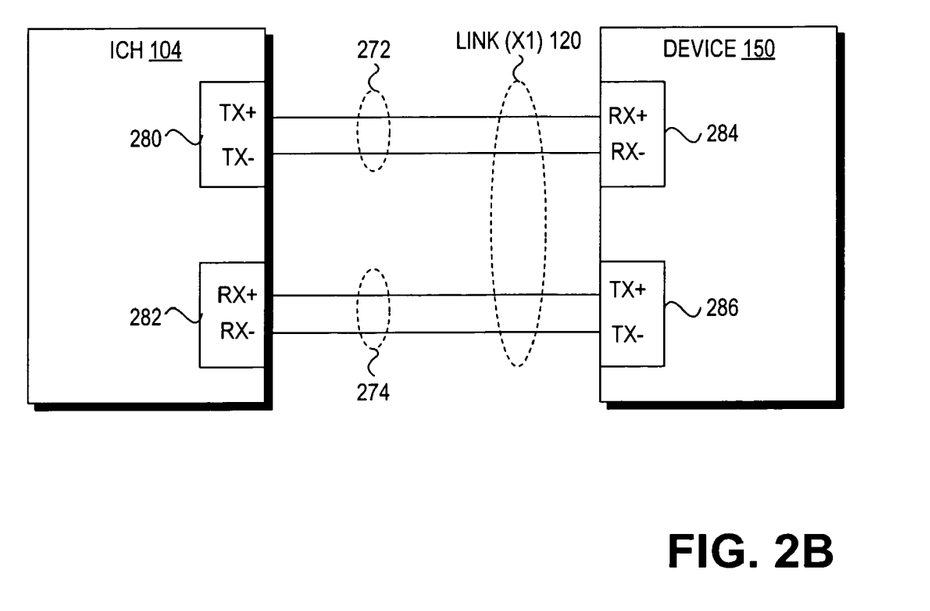
FIG. 2B is a block diagram illustrating a PCIe link in accordance with one embodiment of the present invention.

Referring to FIGS. 2A and 2B, details regarding PCIe to support embodiments of the invention will be discussed. FIG. 2A shows ICH 104 coupled to device 150 via PCIe Link 120. Link 120 is an interconnect between port 140 of ICH 104 and a port 260 of device 150.

In FIG. 2A, link 120 includes one lane. In accordance with the PCIe specification, a one lane width of a link is described using a "x1" notation. Each lane of a link represents a set of differential signaling pairs, one pair for transmitting and one pair for receiving resulting in a total of 4 signals. In FIG. 2A, link 120 includes a transmit differential pair 272 and a receive differential pair 274, where transmit and receive are from the perspective of ICH 104.

The width of link 120 may be aggregated using multiple lanes to increase the bandwidth of the connection between ICH 104 and device 150. In one embodiment, link 120 may include a x1, x2, x4 link, x8 link, x16 link, or a x32 link. For example, a x4 link includes 4 lanes. In one embodiment, a lane in one direction has a rate of 2.5 Gigabits per second.

FIG. 2A also shows the logic layers of an embodiment of the PCIe protocol. Port 140 includes a Transaction Layer 254, a Data Link Layer 256, and a Physical Layer 258. Port 260 of device 150 includes a corresponding Transaction Layer 264, Data Link Layer 266, and Physical Layer 268.

Information is communicated between link endpoints using packets. To send a packet, the packet is started at the Transaction Layer and passed down to the Physical Layer. The packet is received at the Physical Layer of the receiving device and passed up to the Transaction Layer. The packet data is extracted from the packet at the receiving device.

FIG. 2B shows further details of the physical layer of link 120. ICH 104 includes a transmitter 280 coupled to differential pair 272 that is coupled to receiver 284 of device 150. A transmitter 286 of device 150 is coupled to differential pair 274 that is coupled to a receiver 282 of ICH 104.

Figure 3:
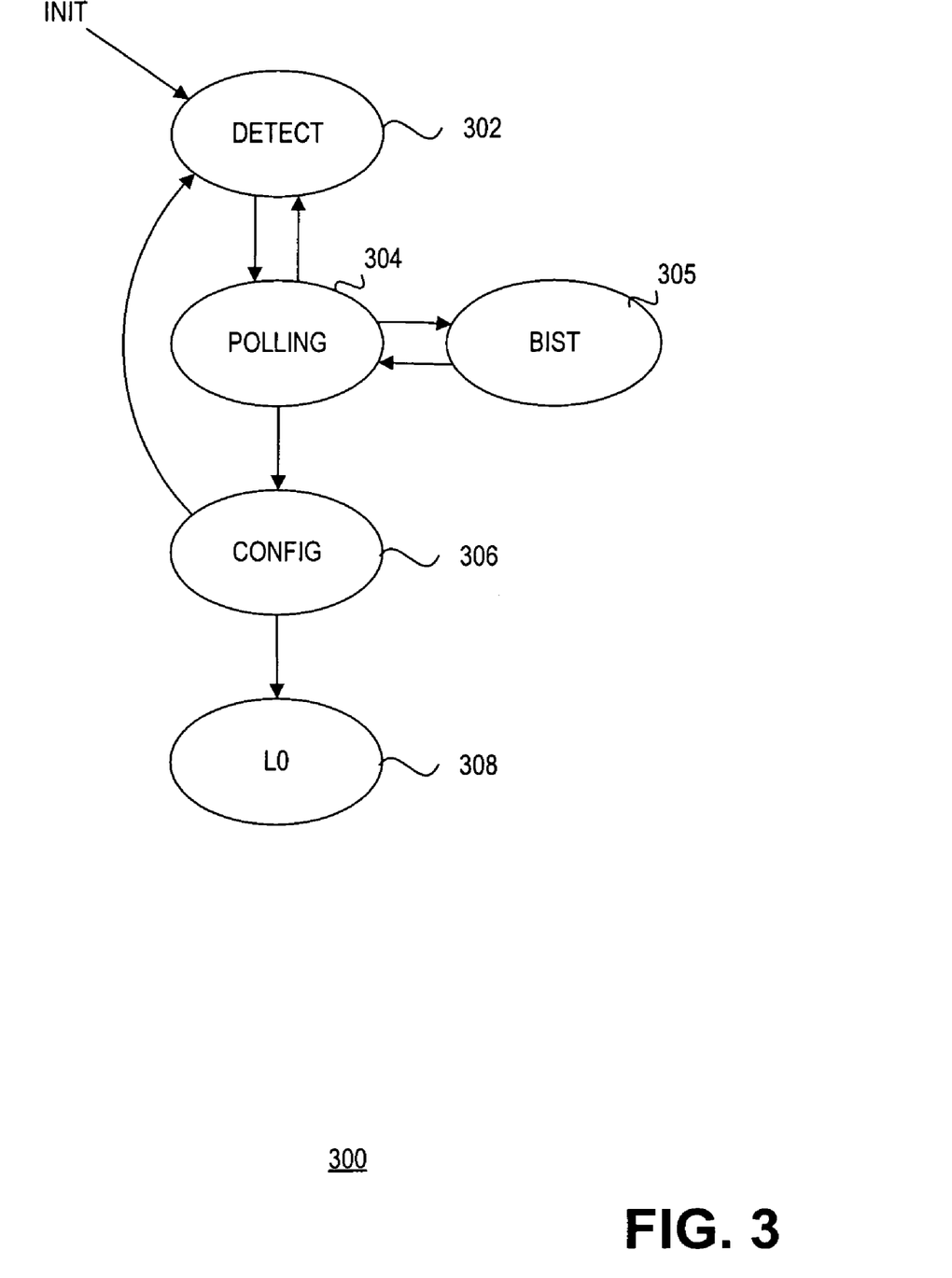
FIG. 3 is a block diagram illustrating a link training state machine in accordance with one embodiment of the present invention.

Turning to FIG. 3, a link training and status state machine 300 in accordance with embodiments herein is shown. In one embodiment, state machine 300 is implemented as hardware logic in each link training engine 132 and 136.

Link training and status state machine 300 is substantially in compliance with the Link Training and Status State Machine as described in the PCIe specification. It will be appreciated that other states of state machine 300 as described in the PCIe specification are not included herein for the sake of clarity. As described below, the link status and training state machine 300 from the PCIe specification has been altered in accordance with embodiments of the invention, however, state machine 300 remains in compliance with the PCIe specification.

A Detect state 302 is entered after system initialization or hot-plugging of a device. The purpose of Detect 302 is to detect when a device is on the other end of the link. Transmitter(s) at ICH 104 send a Receiver Detect sequence. If a receiver is detected, then state machine 300 proceeds to a Polling state 304.

In Polling 304, the number of lanes and their status is determined. Lane polarity and data rate is established. During Polling 304, training ordered sets are sent between ICH 104 and the device. During Polling 304, if various errors occur, state machine 300 returns to Detect 302.

In accordance with embodiments herein, a logic hook is positioned in Polling 304 so that the logic proceeds to a BIST state 305. The hook is placed after completion of Polling 304, but before posting the Link Status by Polling 304.

After completion of BIST state 305, the results of training done during Polling 304 and testing by BIST 305 are compared. In one embodiment, the results of link training and BIST testing are both in the form of a pass/fail status for each lane of the link (described below as a lane bitmap). In this particular embodiment, the posting of link status is in the form of a pass/fail status for the link, and is a conglomeration of the pass/fail status of each lane of the link. In one embodiment, the posted link status from link training is used by the operating system during OS boot.

In a PCIe implementation, the link status is posted in a Link Status Register per the PCIe specification. The link status is reported as a binary pass/fail status. One or more lanes of a link may have a failure, but the link status may still be reported as passing. In this case, the link may be operated in a degraded mode. A Degraded Mode Status register will indicate the nature of the error causing the degraded mode.

In one embodiment, if the results from link training and BIST are the same, then the link status is reported by Polling 304 and the state machine continues to a Configuration state 306. If the results are inconsistent, then an error condition is entered (described further below). Conducting BIST testing during link training by state machine 300 as described herein keeps link training within timing restrictions delineated by the PCIe specification.

After successful completion of Polling 304, state machine 300 transitions to Configuration 306. In Configuration 306, lanes of a port are formed into a link. Link width lane negotiation sequences are conducted. Data is communicated at the data rate negotiated in Polling 304. A failure during Configuration 306 may return state machine 300 to Detect 302.

After completion of Configuration 306, the logic proceeds to a L0 state 308. L0 308 is the normal operational state of the link where data and control packets may be transmitted and received.

Figure 4:
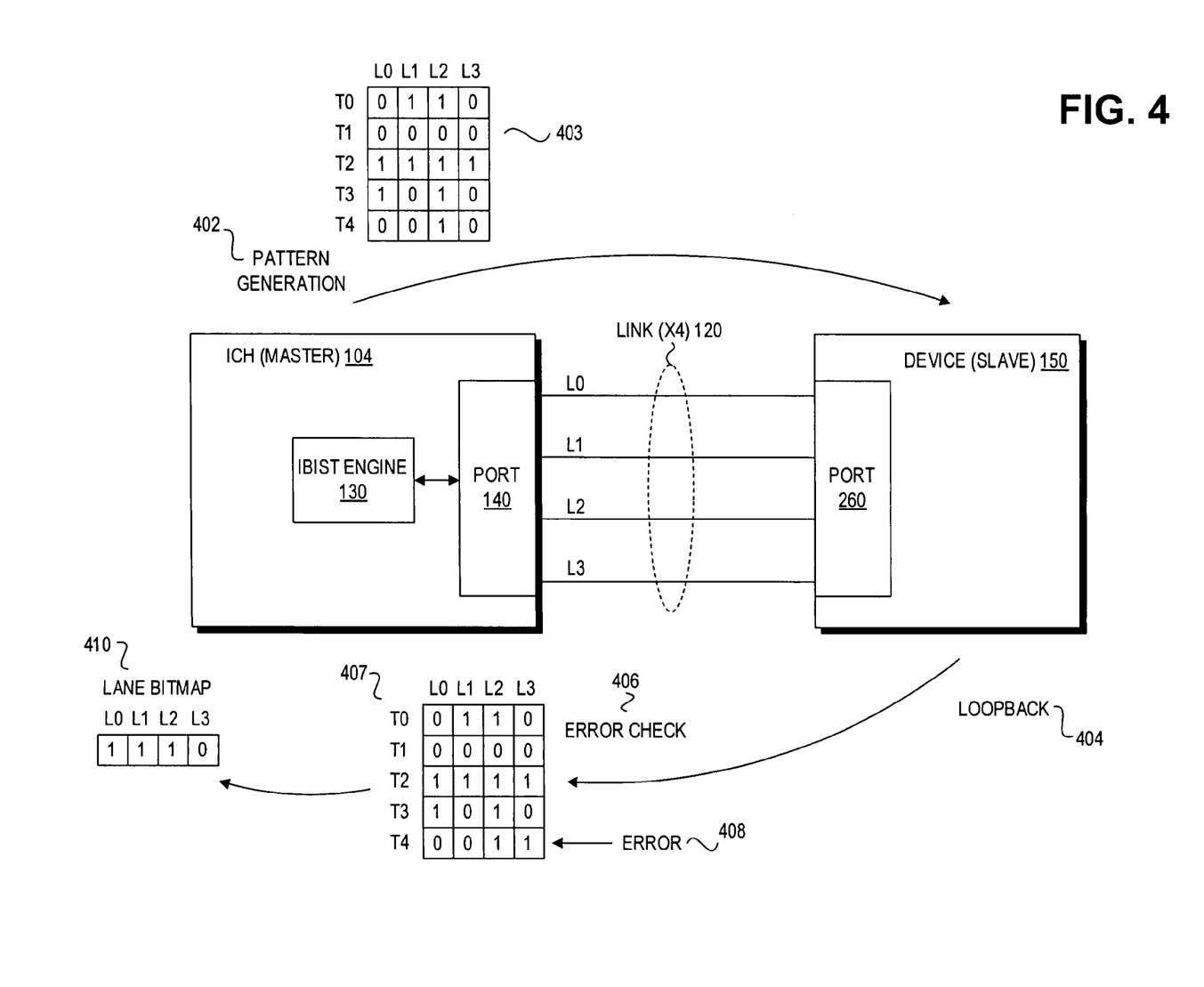
FIG. 4 is a block diagram illustrating an environment to support automated BIST execution for a link in accordance with one embodiment of the present invention.

Referring to FIG. 4, an embodiment of an Interconnect-BIST (IBIST) architecture to support embodiments of the invention is shown. IBIST is an on-die feature which enables interconnect testing. The IBIST architecture utilizes the same component interconnect and timing paths as normal link operation. IBIST operation is independent of operating system or cache protocol. In the embodiment of FIG. 4, link 120 is a x4 link, that is, link 120 has 4 lanes numbered L0, L1, L2, and L3. FIG. 4 shows only one IBIST engine, engine 130, on the ICH 104 end of link 120. In alternative embodiments, an IBIST engine may reside on the device 150 end of link 120.

At the beginning of IBIST testing, ICH 104 is designated the master and device 150 is designated the slave. In short, IBIST testing involves IBIST engine 130 sending various test patterns to device 150. Device 150 attempts to mirror back the same patterns. IBIST engine 130 compares test patterns transmitted to device 150 to test patterns received back from device 150 to identify problems.

IBIST engine 130 generates test patterns 403 at pattern generation 402. Test patterns 403 show the bits sent on each lane (L0-L3) from time 0 (T0) to time 4 (T4). It will be understood that a simplified test pattern is shown in FIG. 4 for the sake of clarity. Device 150 performs a loopback 404 to repeat back the same test pattern in the same timing sequence as received from ICH 104.

IBIST engine 130 performs an error check 406 on the received test patterns 407. The embodiment of FIG. 4 shows a direct bit comparison for error checking. Other embodiments use a Multiple Input Signature Register (MISR) error checking technique.

In FIG. 4, an error, shown at 408, is detected in lane L3 at time T4. A logical '0' was sent, but ICH 104 received a logical '1' in return. In one embodiment, the results of IBIST testing are formed into a lane bitmap 410 by IBIST engine 130. Lane bitmap 410 shows the results at each lane, L0 to L3. As shown in FIG. 4, lanes L0 to L2 are set to logical '1' because these lanes passed. Lane L3 is set to logical '0' because lane L3 failed IBIST testing.

Figure 5:
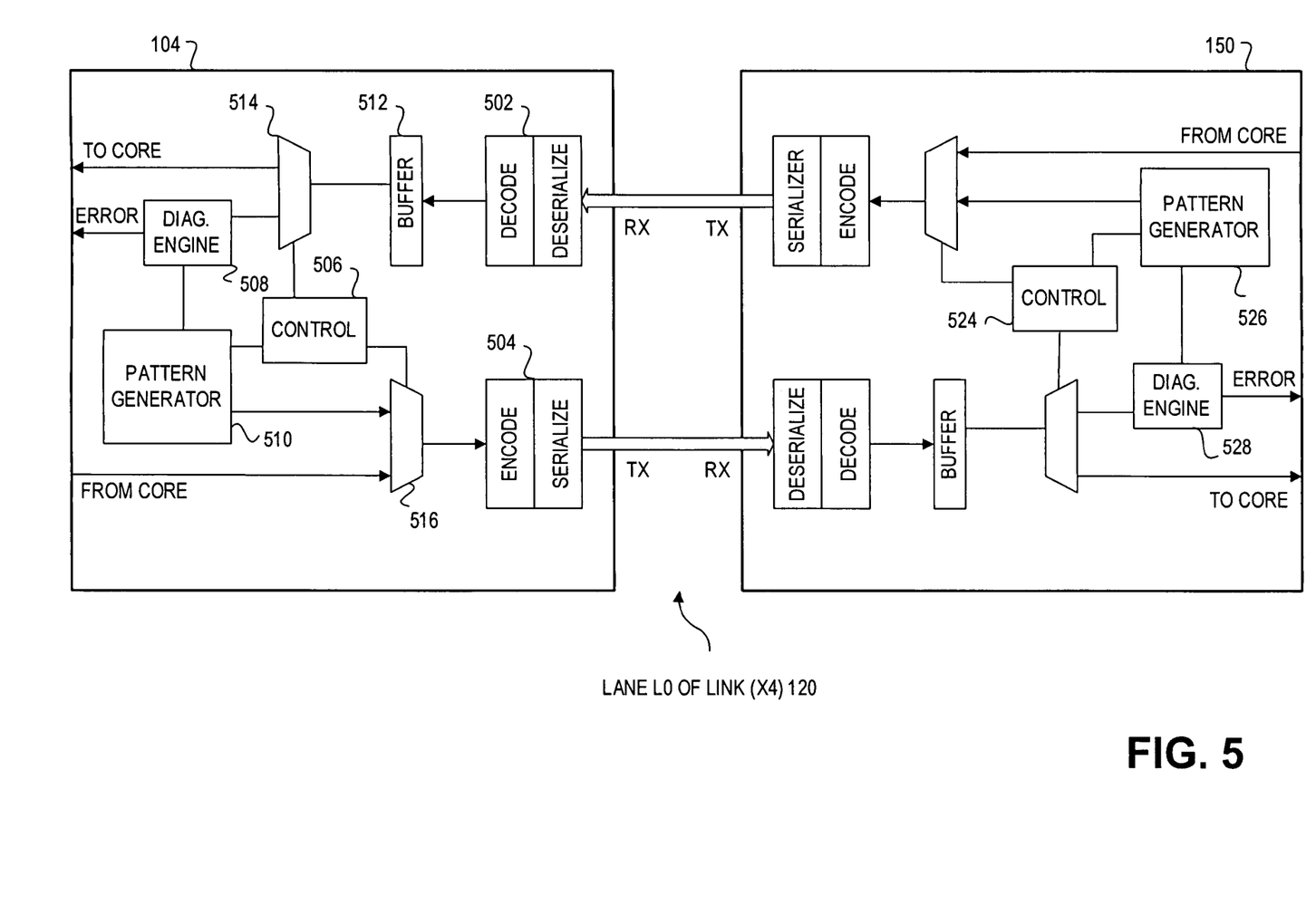
FIG. 5 is a block diagram of an Interconnect-BIST (IBIST) architecture in accordance with one embodiment of the present invention.

Turning to FIG. 5, an embodiment of IBIST architecture for use with a differential link, such as PCIe, to support embodiments of the invention is shown. While FIG. 5 shows only the IBIST architecture for Lane 0 of a x4 link 120, it will be appreciated that a similar architecture may be present for lanes L1 to L3.

The IBIST architecture at ICH 104 includes a pattern generator 510, a diagnostic engine 508, and a test control 506. In the embodiment of FIG. 5, device 150 includes corresponding IBIST components including a pattern generator 526, a diagnostic engine 528, and a test control 524. While the following discussion of IBIST is directed to ICH 104, it will be appreciated that the IBIST architecture at device 150 operates in a similar manner. It will also be appreciated that embodiments herein do not require that device 150 include an IBIST architecture.

A test pattern is generated at pattern generator 510 and sent to multiplexer 516. Test control 506 controls multiplexer 516 to select either the test patterns or a normal signal from the core. The core refers to portions of the ICH or device that process information that is received and/or to be transmitted. The test patterns are passed through the encode/serialize unit 504 for transmission on lane L0.

Signals that have been loopbacked from device 150 are received at a deserialize/decode unit 502. The signals are sent to an elastic buffer 512 and then to multiplexer 514. In one embodiment, elastic buffer 512 may be used to compensate for differences in frequencies between bit rates at ends of the link. Based on control signals from test control 506, the signals pass to the core for normal processing or to diagnostic engine 508. Diagnostic engine 508 compares the transmitted test patterns to the patterns returned from device 150. Diagnostic engine 508 issues error signaling when a failure is determined.

Figure 6:
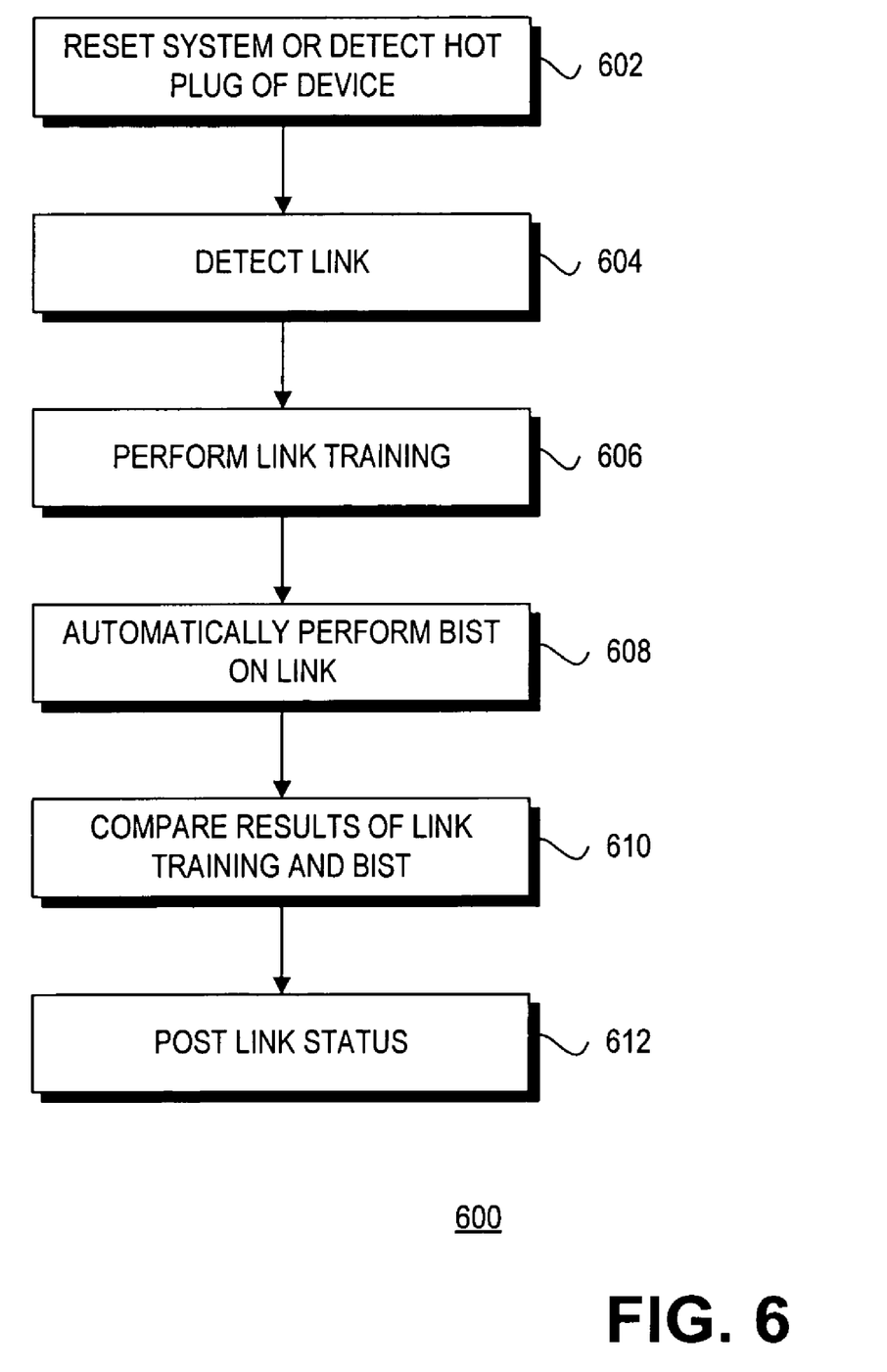
FIG. 6 is a flowchart illustrating the logic and operations for automated BIST execution for a link in accordance with one embodiment of the present invention.

Referring to FIG. 6, a flowchart 600 of the logic and operations of an embodiment of the present invention is shown. In one embodiment of flowchart 600, link training is in accordance with Link Training of the PCIe specification and the BIST testing is in accordance with the Interconnect-BIST architecture.

Starting in a block 602, the computer system is reset or a device has been hot-plugged into the system. Proceeding to a block 604, the link is detected. Continuing to a block 606, link training is performed on the link. Continuing to a block 608, BIST testing is automatically performed on the link after link training is completed. Continuing to a block 610, the results of link training and BIST testing are compared. After block 610, the logic proceeds to a block 612 to post the link status.

Figure 7A:
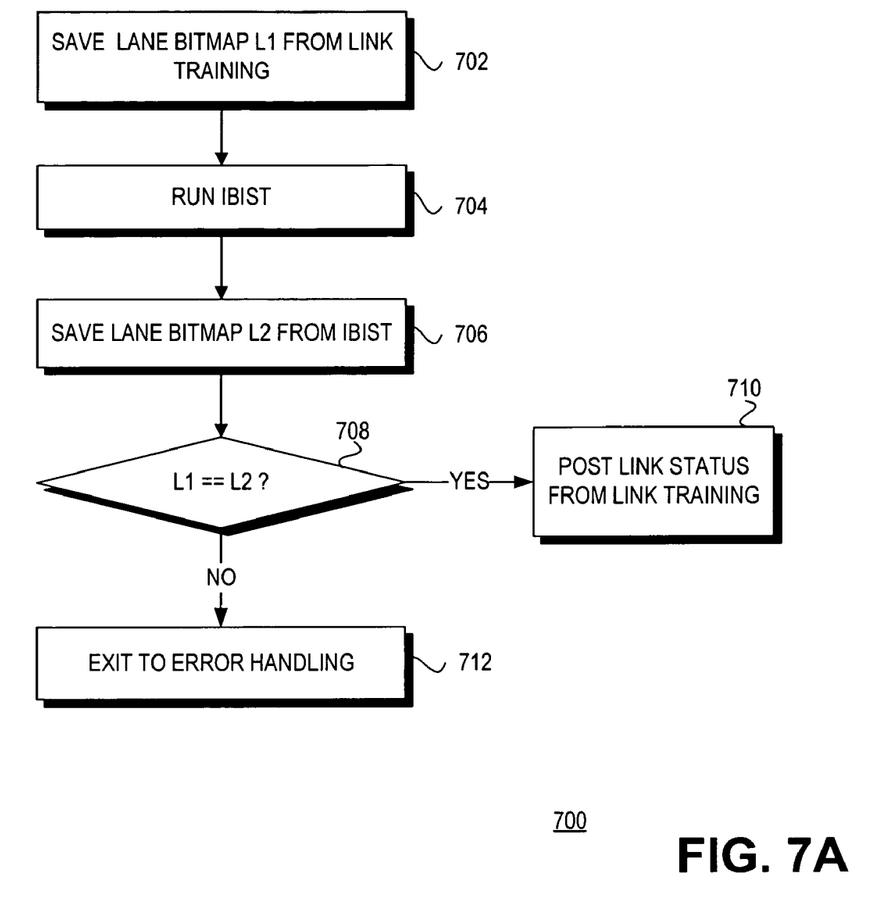
FIG. 7A is a flowchart illustrating the logic and operations for automated BIST execution for a link in accordance with one embodiment of the present invention.

Turning now to FIG. 7A, a flowchart 700 of the logic and operations of an embodiment of the invention is shown. In one embodiment, the logic and operations of flowchart 700 may be implemented as hardware circuitry on ICH 104. In this particular embodiment, the logic of flowchart 700 may occur without support from software executing on the computer system. An embodiment of flowchart 700 may be implemented using a PCIe compliant link and IBIST architecture.

Starting in a block 702, the lane bitmap L1 from link training is saved. In one embodiment, the results of link training are formed into a lane bitmap similarly as described above in FIG. 4. In one embodiment, lane bitmap L1 is saved in one or more registers of the computer system. The logic continues to a block 704 where IBIST is run. Continuing to a block 706, lane bitmap L2 from IBIST is saved. In one embodiment, lane bitmap L2 is saved in one or more registers.

In one embodiment, IBIST may be entered by setting the required bit in the IBIST control register automatically, either in the test "master" or the test "slave" (if the "slave" includes the IBIST feature). Entering IBIST mode inhibits normal data flow from the Data Link layer to the Physical layer in both the IBIST master and the IBIST slave. The IBIST master then issues a new training sequence with a Loopback bit set. After the master enters IBIST mode and the slave enters Loopback mode, the master begins sending the IBIST test sequence.

Error checking may be accomplished by either direct comparison of data at the master or by a Multiple Input Signature Register (MISR) technique. When the master has completed transmission of the test sequence, the master will signal the end of the test sequence by sending an Electrical Idle Ordered-Set (EIOS) followed by an electrical idle.

In one embodiment, at the end of the IBIST test, the IBIST enable bit is automatically de-asserted. Typically, the ends of the link will re-enter a "normal" mode and continue as prescribed by the PCIe specification. The test host polls the IBIST control register for completion of the test and reads out the error status bits. In one embodiment, the error status bits are formed into a lane bitmap.

IBIST configuration and control access is available through several interfaces. In one embodiment, IBIST is addressable via Firmware (a.k.a., Basic Input/Output System (BIOS)) and has an on-board Board/System In-Target Probe/eXtra Device Port (ITP/XDP) (or other system level debug port) interface that facilitates the use of the test configuration, sequencing, and result analysis features contained within the IBIST architecture.

The logic of flowchart 700 proceeds to a decision block 708 to determine if lane bitmaps L1 and L2 are identical. The integration of IBIST with PCIe link training enables the ease of sharing of lane bitmaps generated by the two engines. In one embodiment, the logic performs and exclusive-OR (XOR) operation on the lane bitmaps L1 and L2.

Figure 7B:
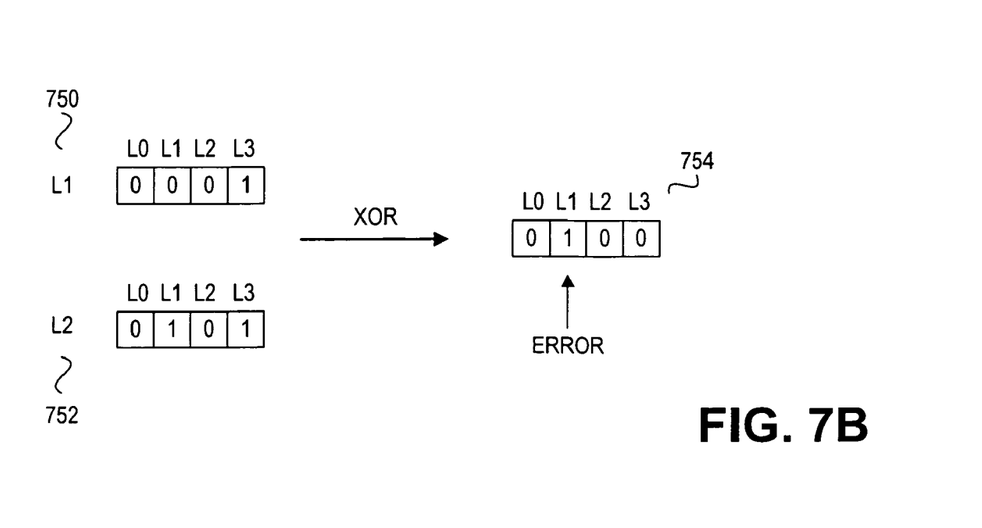
FIG. 7B is a block diagram illustrating a comparison logic in accordance with one embodiment of the present invention.

FIG. 7B shows an embodiment of using an XOR operation. A lane bitmap L1 from link training is shown at 750 and a lane bitmap L2 from IBIST is shown at 752. An XOR is performed where results from the same lanes are XORed. The result of the XOR comparison for each lane is shown at 754. An error is shown in lane L1 because lane L1 of link training and lane L1 of IBIST had different results. In one embodiment, the XOR logic as shown in FIG. 7B may be implemented in comparison logic 133 of FIG. 1.

Returning to FIG. 7A, if the answer to decision block 708 is yes, then the logic proceeds to a block 710 to post the link status as determined from link training. In one instance, link training and BIST did not result in any lane failures. In another instance, link training and BIST found lane failures on the same lanes. In this case, the link may still be used, but in a degraded mode, if one or more lanes of the link has a failure.

If the answer to decision block 708 is no, then the logic proceeds to a block 712. If decision block 708 is no, then lane bitmaps L1 and L2 had different results. For example, link training showed no lane failures, but IBIST did find one or more lane failures. In another example, link training found lane failures, but IBIST did not result in any lane failures. In yet another example, link training and IBIST testing resulted in failures on different lanes.

In block 712, the logic exits to an error handling routine. Link errors may be handled as per platform policy. In an embodiment using PCIe, error handling in accordance with the PCIe specification may be employed. In short, the PCIe specification classifies errors as Correctable and Uncorrectable where Uncorrectable errors may be further classified as fatal and non-fatal.

Embodiments of the present invention provide for an automated BIST execution scheme for a link. In one embodiment, integrating an Interconnect-BIST as part of link training in PCIe offloads any software stack dependency while enhancing PCIe Link Training robustness. IBIST testing may enhance link training by accounting for failures due to crosstalk, or the like.

In one embodiment, IBIST testing is automatically initiated after link training but before the results of link training are posted. Link training and IBIST testing are coordinated so that a determination may be made if the same lanes failed both routines. Since IBIST is executed as part of PCIe link training, PCIe hardware has access to failed lane bitmaps for both IBIST and link training. If similar lanes are found to be failed, then the link may still be used in a degraded mode. Additionally, embodiments herein provide for this coordination at system startup as well as during hot-plugging of a device into a system.

Further, embodiments herein provide for IBIST to be run as a hook from the PCIe link training engine without violating the timing constraints of the PCIe specification. Because the latency of IBIST is well within the allowed timeout duration for Data Link Layer State Changed Event (as described in the PCIe specification), the operating system or related software sees the PCIe Link Training posted status as per the PCIe specification.

The coordination of link training and IBIST is transparent to an operating system or other software. Thus, extra software overhead is not needed to run IBIST or to read the results of IBIST. Also, an OS driver is not needed to support automated IBIST testing when hot-plugging during OS runtime.

Figure 8:
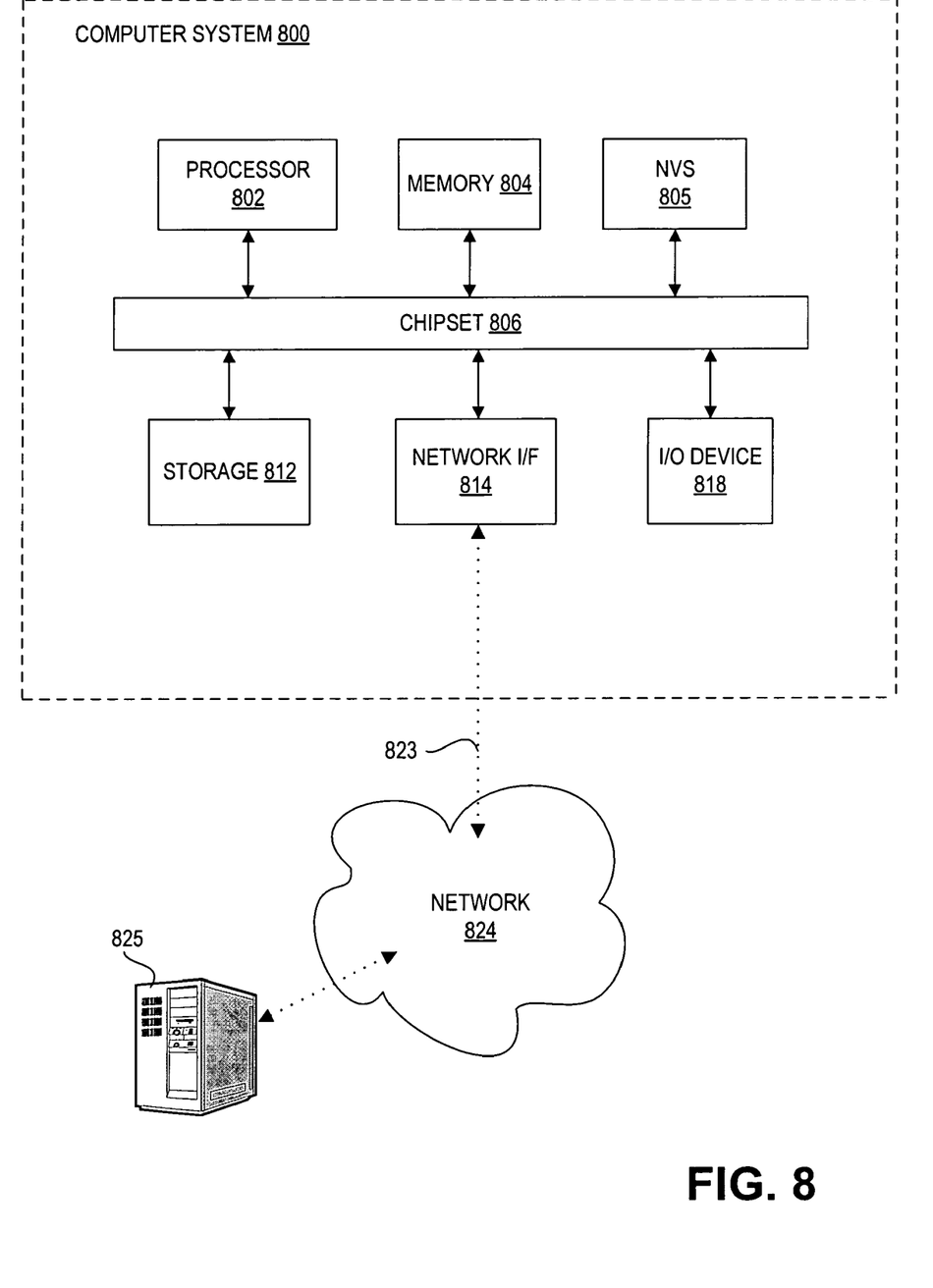
FIG. 8 is a block diagram illustrating one embodiment of a computer system to implement embodiments of the present invention.

FIG. 8 is an illustration of one embodiment of an example computer system 800 on which embodiments of the present invention may be implemented. Computer system 800 includes a processor 802 and a memory 804 coupled to a chipset 806. Storage 812, Non-Volatile Storage (NVS) 805, network interface (I/F) 814, and Input/Output (I/O) device 818 may also be coupled to chipset 806. Embodiments of computer system 800 include, but are not limited to, a desktop computer, a notebook computer, a server, a personal digital assistant, a network workstation, or the like. In one embodiment, computer system 800 includes processor 802 coupled to memory 804, processor 802 to execute instructions stored in memory 804.

Processor 802 may include, but is not limited to, an Intel Corporation x86, Pentium®, Xeon®, or Itanium® family processor, or the like. In one embodiment, computer system 800 may include multiple processors. In another embodiment, processor 802 may include two or more processor cores.

Memory 804 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 804 may include one or more memory units that do not have to be refreshed.

Chipset 806 may include a memory controller, such as a Memory Controller Hub (MCH), an input/output controller, such as an Input/Output Controller Hub (ICH), or the like. In an alternative embodiment, a memory controller for memory 804 may reside in the same chip as processor 802. Chipset 806 may also include system clock support, power management support, audio support, graphics support, or the like. In one embodiment, chipset 806 is coupled to a board that includes sockets for processor 802 and memory 804.

Components of computer system 800 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 818 may include a keyboard, a mouse, a display, a printer, a scanner, or the like.

Computer system 800 may interface to external systems through network interface 814. Network interface 814 may include, but is not limited to, a modem, a Network Interface Card (NIC), or other interfaces for coupling a computer system to other computer systems. A carrier wave signal 823 may be received/transmitted by network interface 814. In the embodiment illustrated in FIG. 8, carrier wave signal 823 is used to interface computer system 800 with a network 824, such as a Local Area Network (LAN), a Wide Area Network (WAN), the Internet, or any combination thereof. In one embodiment, network 824 is further coupled to a computer system 825 such that computer system 800 and computer system 825 may communicate over network 824.

Computer system 800 also includes non-volatile storage 805 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 812 includes, but is not limited to, a magnetic disk drive, a magnetic tape drive, an optical disk drive, or the like. It is appreciated that instructions executable by processor 802 may reside in storage 812, memory 804, non-volatile storage 805, or may be transmitted or received via network interface 814.

It will be appreciated that in one embodiment, computer system 800 may execute Operating System (OS) software. For example, one embodiment of the present invention utilizes Microsoft Windows® as the operating system for computer system 800. Other operating systems that may also be used with computer system 800 include, but are not limited to, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Various operations of embodiments of the present invention are described herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method performed by hardware logic without support from software executing on a processor, comprising:
performing link training of a link, wherein the link is an interconnect between two devices of a computer system;
performing a built-in self test (BIST) of the link;
comparing a result from the link training to a result from the BIST, wherein comparing the result from the link training to the result from the BIST includes comparing the results from the same lanes of the link, and further wherein comparing the results from the same lanes includes comparing a link training lane bitmap to a BIST lane bitmap;
posting a link status of the link, wherein the link status is based at least in part on the result from the link training and the result from the BIST
wherein the method is performed without complicity from the operating system.

2. The method of claim 1 wherein performing the BIST includes automatically performing the BIST after the link training.

3. The method of claim 1, further comprising performing an error handling routine if the result for a lane after link training is different from the result for the same lane from the BIST.

4. The method of claim 1 wherein the link includes a Peripheral Component Interconnect (PCI) Express link, wherein the BIST includes an Interconnect Built-In Self Test (IBIST).

5. An apparatus, comprising:
a first port for a first link;
a first link training engine coupled to the first port; and
a first built-in self-test (BIST) engine connected to the first port and to the first link training engine, wherein the first BIST engine to be automatically initiated by the first link training engine,
wherein the first link training engine includes a comparison logic to compare the results of the first link training engine to the results of the first BIST engine, and further wherein the comparison logic is to compare a link training lane bitmap from the first link training engine to a BIST lane bitmap from the first BIST engine.

6. The apparatus of claim 5 wherein the first BIST to run without support from software.

7. The apparatus of claim 5 wherein the first link training engine includes a link training and status state machine substantially in compliance with a Peripheral Component Interconnect (PCI) Express specification.

8. The apparatus of claim 5, further comprising:
a second port for a second link;
a second link training engine coupled to the second port; and
a second built-in self-test (BIST) engine connected to the second port and to the second link training engine, wherein the second BIST engine to be automatically initiated by the second link training engine.

9. The apparatus of claim 5 wherein the link includes a Peripheral Component Interconnect (PCI) Express link.

10. The apparatus of claim 5 wherein the BIST includes an Interconnect Built-In Self Test (IBIST).

* * * * *